United States Patent
Na

(10) Patent No.: US 6,528,966 B2
(45) Date of Patent: Mar. 4, 2003

(54) SENSORLESS VECTOR CONTROL APPARATUS AND METHOD THEREOF

(75) Inventor: Seung Ho Na, Seoul (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 09/931,022

(22) Filed: Aug. 17, 2001

(65) Prior Publication Data

US 2002/0021105 A1 Feb. 21, 2002

(30) Foreign Application Priority Data

Aug. 18, 2000 (KR) ........................................ 2000-47837

(51) Int. Cl.$^7$ ................................................ H02P 1/24
(52) U.S. Cl. ........................ 318/727; 318/798; 318/799; 318/609; 318/610; 318/801; 318/805; 363/13; 363/37
(58) Field of Search ................................. 318/609, 610, 318/727, 798, 799, 801, 805, 811; 363/13, 37

(56) References Cited

U.S. PATENT DOCUMENTS

| | | | | |
|---|---|---|---|---|
| 4,451,771 A | * | 5/1984 | Nagase et al. ............... | 318/800 |
| 4,680,526 A | * | 7/1987 | Okuyama et al. ........... | 318/802 |
| 5,140,248 A | * | 8/1992 | Rowan et al. ............... | 318/811 |
| 5,965,995 A | * | 10/1999 | Seidel et al. ................ | 318/805 |
| 6,009,003 A | * | 12/1999 | Yeo .............................. | 363/37 |
| 6,014,007 A | * | 1/2000 | Seidel et al. ................ | 318/805 |
| 6,147,470 A | * | 11/2000 | Ohashi et al. ............... | 318/757 |
| 6,335,605 B1 | * | 1/2002 | Negoro ........................ | 318/727 |
| 6,229,719 B1 | * | 5/2002 | Sakai et al. .................. | 363/37 |

\* cited by examiner

Primary Examiner—Robert E. Nappi
Assistant Examiner—Rina I. Duda
(74) Attorney, Agent, or Firm—Birch, Stewart, Kolasch & Birch, LLP

(57) ABSTRACT

A sensorless vector control apparatus includes a speed controller for receiving a speed command value from a user and outputting a synchronous speed; a 'd' and 'q' axis voltage command unit for receiving the synchronous speed and outputting a 'd' axis voltage and a 'q' axis voltage; a voltage converter for receiving the 'q' axis voltage and the 'd' axis voltage, and converting the two phase voltages into three phase voltages; and an inverter for receiving the three phase voltages and controlling a speed of an induction motor. Since the vector control may be performed over the whole velocity range without using a speed sensor, the sensorless vector control apparatus may be used with advantage.

16 Claims, 8 Drawing Sheets

SLIP -(CURRENT, TORQUE)CURVE

300rpm POSITIVE LOAD TEST

300rpm NEGATIVE LOAD TETS

1500rpm POSITIVE LOAD TEST

1500rpm NEGATIVE LOAD TEST

SENSORLESS VECTOR CONTROL APPARATUS AND METHOD THEREOF

BACKGROUND OF THE INVENTION

1. Field of the Invention

The present invention relates to a vector control apparatus, and more particularly, to a sensorless vector control apparatus and method for controlling a variable speed operation and speed of an induction motor.

2. Description of the Background Art

In general, an induction motor has been primarily used for a constant speed operation as it is more difficult to control in comparison to a DC motor. However, as a vector control theory is introduced and a high performance central processing unit (CPU) or digital signal processor (DSP) is developed, the induction motor is now capable of being controlled for a variable speed operation.

The vector control theory is a method in which three phase AC powers ('a' phase, 'b' phase and 'c' phase) inputted at 120° intervals are disassembled (converted) by a direct axis and a quadrature axis of 90° intervals, and their size are controlled to a desired value and restored (inverted) to the three phase powers, to thereby control the three AC powers. This method is mainly used to control the induction motor.

In order to vector-control the induction motor, the speed or magnetic flux information of the induction motor is required. In order to measure the speed or the magnetic flux information, a speed sensor or a magnetic flux sensor such as a Tacho generator, resolver or a pulse encoder is required.

However, since the sensors include an electronic circuit, the induction motor having the sensors must be used within the operable temperature range of the electronic circuit, and signal wiring between the speed sensor and the inverter incurs much expense.

Also, the use of sensors is avoided as the connections between the sensors and the induction motor are susceptible to damage upon impact of the motor.

Accordingly, recently, various speed estimation methods of the induction motor has been proposed with respect to the sensorless vector control without the speed sensor. Among them, as a high speed algorithm method, a method based on a model reference adaptive system, an adaptive observer, that is, a method for estimating a speed or a slip frequency independently from a main control system, is used for consideration of a stability of a speed estimation, and as a low speed algorithm method, a high frequency injection method is used.

FIG. 1 is a schematic block diagram of a speed control apparatus which supplies a synchronous speed according to a voltage to frequency method in accordance with the prior art.

As shown in FIG. 1, the conventional speed control apparatus includes an angular velocity generator 1 receiving a command frequency (F) by a user's input, converting it to an electric angular velocity (We) to be applied to a motor, and outputting it; a voltage generator 2 receiving the command frequency (F), generating a voltage (V) according to a Voltage to Frequency ratio(V/F ratio), and outputting it; and an inverter 3 controlling a speed of an induction motor (IM) by using the electric angular velocity (We) outputted from the angular velocity generator 1 and the voltage outputted from the voltage generator 2.

The operation of the conventional speed control apparatus constructed as described above will now be explained.

Generally, in an industrial site, the speed detecting unit is not required, and instead, a common inverter of a variable voltage variable frequency (VVVF) method which is simply controlled is widely used.

In order to constantly maintain a flux of the induction motor, the common inverter constantly controls a ratio between an output voltage of the inverter and an output frequency (V/F=constant), and a synchronous speed (rpm (rotation per minute)) of a rotational magnetic field is controlled by varying the output frequency.

$$\text{Synchronous speed (rpm)} = 120 * F/P \quad (1)$$

wherein 'P' indicates the number of poles of a stator winding and 'F' indicates a command frequency of a current flowing at the stator winding.

Input voltage (Vs) is determined as follows:

$$Vs = Rs*Is + (Lls + Lm)*dIs/dt \quad (2)$$

wherein 'Rs' indicates a stator resistance, 'Is' indicates an input current of the induction motor', 'Lls' indicates stator leakage reactance, and 'Lm' indicates a magnetized reactance.

In the case where the stator resistance (Rs) of the inductor motor is not used in equation (2), the equation becomes:

$$Vs = (Lls + Lm)*dIs/dt \quad (3)$$

Generally, the stator leakage reactance (Lls) is relatively small compared to the magnetized reactance (Lm) in equation (3). Accordingly, equation (3) is computed by equation (4):

$$Vs = Lm*dIs/dt = We*Lm*Is = 2\pi F*\phi \quad (4)$$

In equation (4), since $Vs/F = 2\pi F*\phi$, by constantly providing the ratio of Vs/F, the motor can be controlled while constantly maintaining the flux.

Accordingly, when the command frequency (F) is determined, it is converted to a synchronous speed (We=$2\pi F$) and applied to the induction motor. At this time, in order to constantly maintain the flux of the induction motor, a voltage is generated corresponding to the command frequency (F) so that the V/F ratio is constant, and outputted to the inverter.

Then, the inverter generates three phase voltages by using the synchronous speed (We) and a voltage and supplies them to the induction motor (IM). That is, if the ratio of the V/F is constantly provided, since the flux is constantly maintained, the induction motor can be controlled.

In this respect, since the induction motor is rotated at a slower speed than the synchronous speed, a slip is obtained by the following equation (5):

$$\text{Slip} = (We - Wr)/We$$

Wherein 'We' indicates a synchronous speed and 'Wr' indicates a speed of the induction motor.

FIG. 2 is a graph showing a slip-torque curve wave form of a load and a motor according to the V/F method of the conventional art.

As shown in FIG. 2, the induction motor is operated at an intersection point of the load and the slip-torque curve of the induction motor, and a corresponding current flows.

FIG. 3 is a schematic block diagram of the vector control apparatus in accordance with the conventional art.

As shown in FIG. 3, a vector control apparatus having an inverter for receiving a speed command value (wr*) from a user and supplying three phase currents required for an induction motor, including: a first proportional integrator 5 for receiving an error between the speed command value (wr*) inputted from a user and a speed (wr) actually detected from an induction motor and generating a current command value of 'q' axis component (iqse*); a second proportional controller 8 for receiving an error, that is difference between the current command value of 'q' axis (iqse*) according to a rating of a motor and an actual current of 'q' axis (iqse) flowing through the motor, and generating and outputting a voltage (vqse) for operating the motor at the speed command value (wr*); a third proportional integrator 9 for receiving an error between a current command value of 'd' axis component (idse*) according to a rating of the motor and an actual current of 'd' axis (idse) flowing at the motor, and generating and outputting a voltage (vdse) for operating the motor at the speed command; a static coordinate system converter 10 for receiving the two phase voltages (vqse and vdse) and outputting three phase voltages Va, Vb and Vc; a synchronous coordinate system converter 12 for measuring three phase currents (ias, ibs and ics) inputted to the induction motor, changing the actual current (idse) of 'd' axis flowing at the motor and the actual current (iqse) of 'q' axis flowing at the motor, and outputting it; a slip frequency generator 13 for receiving a current command value of 'q' axis component (iqse*) and a current command value of 'd' axis component (idse*) and generating a slip frequency; an arithmetic control signal generator 14 for receiving a slip frequency (Wslip) of the slip frequency generator 13 and the actually detected speed (Wr) of the induction motor and generating an angular velocity (We); an inverter 11 for receiving the three phase voltages Va, Vb and Vc and controlling a speed of the induction motor; and a speed sensor 15 connected to a shaft of the induction motor, for detecting a speed of the induction motor.

The operation of the conventional vector controlling apparatus constructed as described above will now be explained.

First, a first operator obtains an error between thee speed command value (Wr*) and the actually detected speed (Wr) and provides it to the first proportional integrator 5, the first proportional integrator 5 creates a current command value of 'q' axis component (iqse*) (a torque component) and provides it to a non-inverting terminal (+) of a second operator 6, and a current command value of 'd' axis component generated according to the rating of the motor (idse*) is provided to the non-inverting terminal (+) of a third operator 7.

Then, the second operator 6 and the third operator 7 obtain an error between the 'd' and 'q' axis current command values (idse* and iqse*) and the 'd' and 'q' axis actual currents (idse and iqse) and provide the error to the second proportional integrator 8 and the third proportional integrator 9.

And then, second and third proportional integrators 8 and 9 generate 'd' axis and 'q' axis voltages vdse and vqse, and transmit them to the static coordinate system controller 10, respectively.

At this time, the slip frequency generator 13 obtains Wslip by using 'd' and 'q' axis current command values (idse* and iqse*) and provides it to the non-inverting terminal (+) of the arithmetic control signal generator 14.

The speed sensor 15 for sensing a speed of the induction motor IM provides the sensed motor speed (Wr) to another non-inverting terminal (+) of the arithmetic control signal generator 14.

Then, the arithmetic control signal generator 14 obtains a slip frequency (Wslip) and the motor speed (Wr), computes a synchronous angular velocity (We) of the induction motor, generates an arithmetic control signal for converting a two phase voltages to three phase voltages or three phase voltages to two phase voltages by using the computed synchronous angular velocity (We), and provides it to the static reference frame converter 10 and the synchronous reference frame converter 12.

Accordingly, when the stationary reference frame converter 10 converts the two phase voltages vqse and vdse into three phase voltages va, vb and vc and provides them to the inverter 11, the inverter 11 receives the three phase powers and drives the induction motor.

The sensorless vector control method uses a speed estimation algorithm instead of a speed sensor which detects a speed of the induction motor.

Meanwhile, the conventional variable voltage variable frequency (V.V.V.F) method which does not require a speed detecting apparatus and simply performs a speed control is a V/F method for constantly maintaining the flux of the induction motor simply.

The vector control method of the conventional art, however, has several disadvantages.

That is, first, even though the speed command value is provided as a frequency (F), the value provided to the induction motor is a synchronous speed (We), the actual motor speed is given as 'Wr=We(1-slip)', causing a problem that the actual motor speed is varied by the slip frequency which is changed according to a load.

Secondly, though the ratio of the V/F is constantly maintained to constantly control the flux, since the stator resistance (Rs) contained in the voltage equation (2) is not used, so that the flux is supplied less at a low speed, resulting in a problem that the motor fails to generate a desired output torque.

Thirdly, the conventional vector control method is that, in controlling a speed of the motor with a low speed algorithm, an absolute position of the magnetic flux of the motor is searched by adding a high frequency voltage or a current to a basic wave voltage. This method is thus, effective at a low speed, but not used at a high speed. Conversely, in case of controlling a speed of the motor with a high speed algorithm, the method is effective at a high speed but implementation of the algorithm itself at a low speed is very difficult, causing a problem that it fails to be used to cover the whole velocity range.

Fourthly, in order to use the high speed and low speed algorithm, a parameter of a motor should be accurately obtained. If the parameter is not accurate, a system is unstable, for which, thus, numerous arithmetic operations are required for implementation of algorithm. For this purpose, a central processing unit (CPU) or a digital signal processor (DSP) of a high performance is required, which is difficult to be adopted in general.

SUMMARY OF THE INVENTION

Therefore, an object of the present invention is to provide a vector control apparatus that is capable of preventing a speed variation according to a load and preventing a torque reduction according to a reduction of a flux at a low speed, thereby solving a problem of an initial torque reduction.

Another object of the present invention is to provide a vector control apparatus that is capable of performing a sensorless vector control over the whole velocity range.

Still another object of the present invention is to provide an easily realizable algorithm without using a high performance main operating unit by reducing a dependency on an induction motor parameter and operation amount.

Yet another object of the present invention is to provide a vector control apparatus that is capable of allowing a system to be operated in a stable region in any circumstances by solving a problem of the conventional system operated in an unstable region on a speed-torque curve.

To achieve these and other advantages and in accordance with the purpose of the present invention, as embodied and broadly described herein, there is provided a sensorless vector control apparatus including: a speed controller for receiving a speed command value (Wr*) from a user and outputting a synchronous speed (We); a 'd' axis voltage command unit for receiving an actual current (ids) of 'd' axis and a current (iqs) of 'q' axis flowing through a motor and generating a 'd' axis voltage (Vds); a 'q' axis voltage command unit for receiving the synchronous speed (We) from the speed controller, receiving a current command value of 'd' axis component (ids*) according to a rating of the motor, and generating a 'q' axis voltage (Vqs); a voltage converter for receiving the 'q' axis voltage (Vqs) from the 'q' axis voltage command unit and the 'd' axis voltage (Vds) from the 'd' axis voltage command unit, and converting the two phase voltages (Vqs and Vds) to three phases (Va, Vb, Vc); and an inverter for receiving the three phase powers from the voltage converter and controlling a speed of the induction motor.

To achieve the above objects, there is further provided a sensorless vector control method for receiving the speed command value from a user and controlling the speed of the induction motor, including the steps of: receiving the speed command value (Wr*) by the speed controller; controlling the speed by using the speed controller to compensate a speed variation according to a load variation; operating the synchronous speed (We) outputted from the speed controller and the current command value (ids*) of a flux component and the actual current of 'd' axis (ids) and the actual current of 'q' axis (iqs), and generating a 'q' axis voltage (Vqs) and a 'd' axis voltage (Vds); three-phase converting the generated 'q' axis voltage and 'd' axis voltage, and supplying the three phase powers to the inverter.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
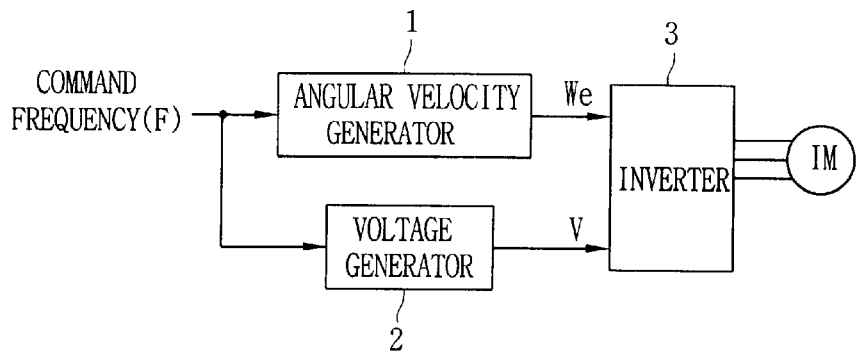
FIG. 1 is a schematic block diagram of a speed control apparatus for supplying a synchronous speed according to a V/F method in accordance with the prior art.
Figure 2:
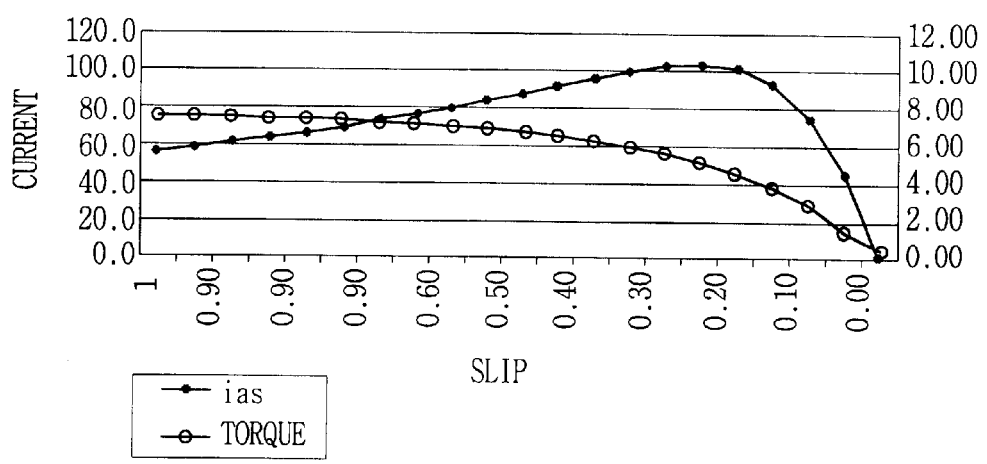
FIG. 2 illustrates slip-torque curve wave forms of a load and a motor according to the V/F method in accordance with the prior art.
Figure 3:
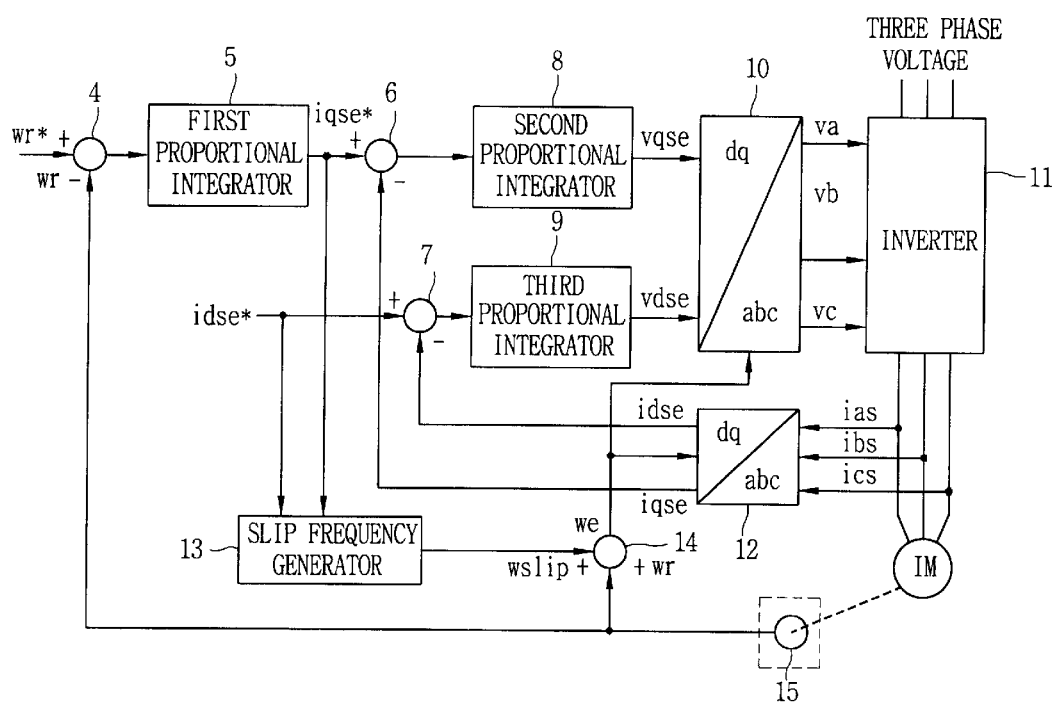
FIG. 3 is a schematic block diagram of a vector control apparatus in accordance with the prior art.
Figure 4:
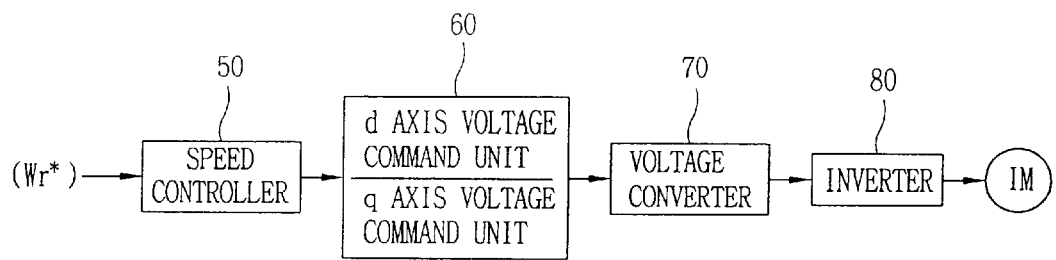
FIG. 4 is a schematic block diagram of a sensorless vector control apparatus in accordance with one embodiment of the present invention.

FIG. 4 is a schematic block diagram of a sensorless vector control apparatus in accordance with one embodiment of the present invention.

As shown in FIG. 4, a sensorless vector control apparatus which drives an induction motor according to a user's input of the present invention includes a speed controller 50 for receiving a speed command value (Wr*) from a user and outputting a synchronous speed (We); a 'd' and 'q' axis voltage command unit 60 for receiving the synchronous speed (We) of the speed controller and outputting a 'd' axis voltage (Vds) and a 'q' axis voltage (Vqs); a voltage converter 70 for receiving the 'q' axis voltage (Vqs) of the 'q' axis voltage command unit and the 'd' axis voltage (Vds) of the 'd' axis voltage command unit and converting the two phase voltages Vqs and Vds to three phase voltages (Va, Vb, Vc); and an inverter 80 for receiving the three phase voltages from the voltage converter and controlling a speed of the induction motor.

The operation of the sensorless vector control apparatus constructed as described above will now be explained.

In the sensorless vector control apparatus for controlling a speed of the induction motor upon receipt of a speed command value (Wr*) from a user, when the speed controller 50 receives a speed command value (Wr*) from a user, it controls the speed to compensate for speed variation according to a load variation. And, the synchronous speed (We) outputted from the speed controller 50, the current command value (ids*) of flux component, an actual current of 'd' axis (ids) and an actual current of 'q' axis (iqs) are operated to generate a 'q' axis voltage (Vqs) and a 'd' axis (Vds). Then, the voltage converter converts the generated 'q' axis voltage and the 'd' axis voltage into three phase voltages and supplies them to the inverter, so that the flux current is constantly maintained and the induction motor can be constantly controlled.

Figure 5:
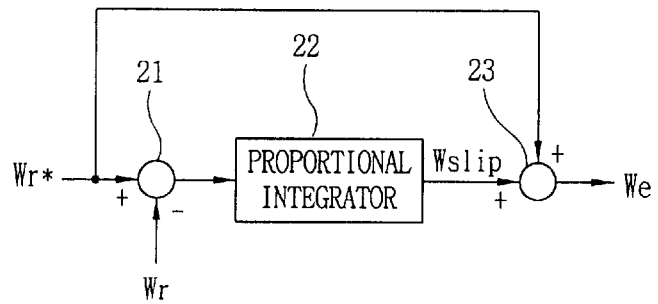
FIG. 5 shows the construction of a speed controller for supplying a synchronous speed in accordance with a preferred, embodiment of the present invention.

FIG. 5 shows the construction of a speed controller for supplying a synchronous speed in accordance with a preferred embodiment of the present invention.

As shown in FIG. 5, the speed controller for supplying a synchronous speed includes an operator 21 for obtaining a difference value between the speed command value (Wr*) according to a user's input and the actual motor speed (Wr)

of the induction motor, a proportional integrator 22 for receiving the difference value outputted from the operator 21, performing a proportional integrating operation and obtaining a slip frequency (Wslip) of the motor; and an operator 23 for receiving the speed command value and the slip frequency (Wslip) and outputting a synchronous speed.

The operation of the speed controller constructed as described above will now be explained.

The operator 21 receives the speed command value (Wr*) according to a user's input, obtains a difference between the speed command value (Wr*) and the actual motor speed (Wr), and provides it to the proportional integrator 22.

Then, the proportional integrator 22 performs a proportional integral operation, obtains the slip frequency (Wslip) of the motor and provides it to the operator 23.

Then, the operator 23 adds the slip frequency Wslip and the speed command value (Wr*) to generate the synchronous speed (We), and provides the generated synchronous speed (We) to the 'q' axis voltage command unit.

The speed controller obtains the synchronous speed (We) by using the slip frequency (Wslip) by the following equation (6):

$$\text{Wslip}=(Rr/Lr)*iqs/ids \tag{6}$$

wherein 'Rr' indicates a secondary resistance of the induction motor, 'Lr' indicates a motor reactance, 'ids' indicates an actual current of 'd' axis (the flux current) flowing at the motor, and 'iqs' indicates an actual current of 'q' axis (the torque current) flowing at the motor.

The motor speed (Wr) is estimated as the following equation (7) by using equation (6) and the synchronous speed (We).

$$\text{Wr}=\text{We}-\text{W slip} \tag{7}$$

Accordingly, as the speed controller controls the slip frequency (Wslip), the speed variation according to a load, the problem of the V/F method, can be prevented and the speed variation according to the load variation is compensated.

Figure 6:
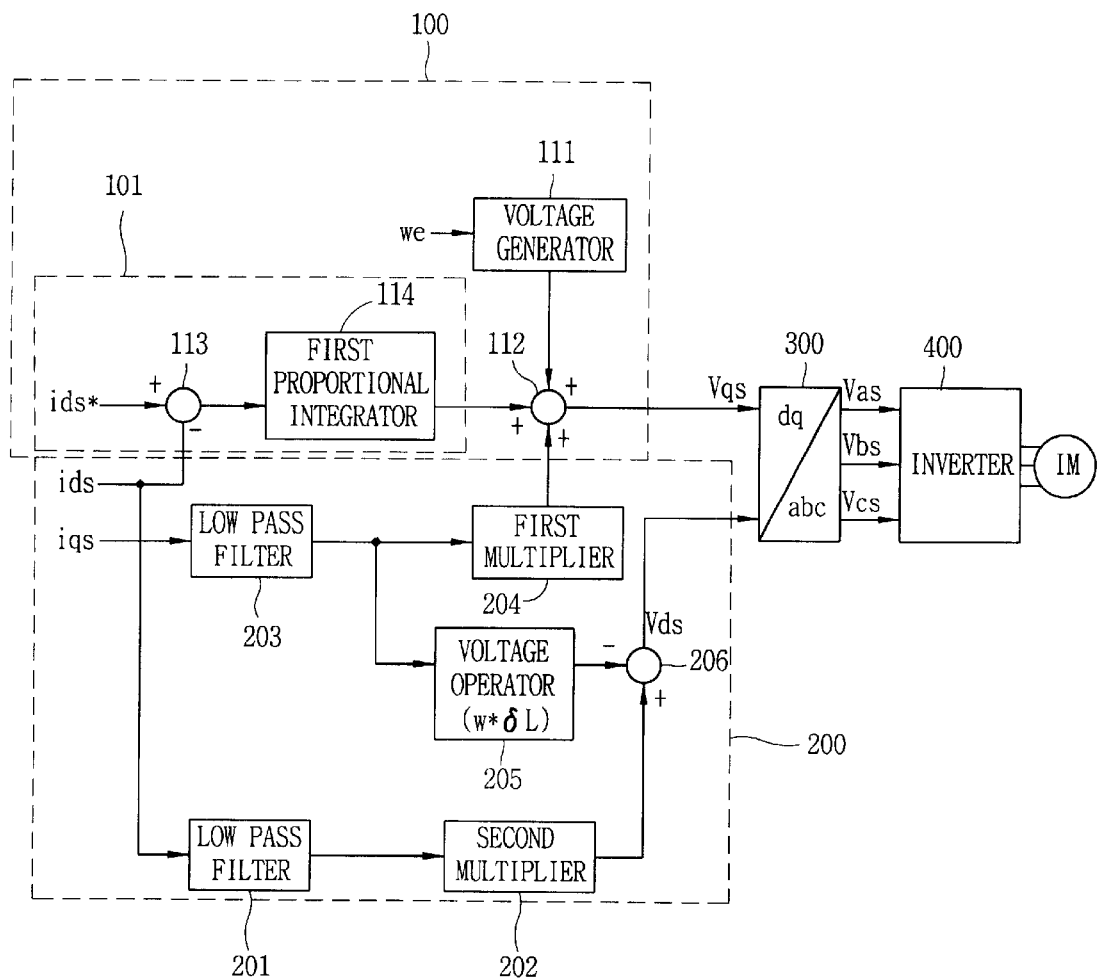
FIG. 6 is a detailed view showing the construction of the sensorless vector control apparatus in accordance with the preferred embodiment of the present invention.

FIG. 6 is a detailed view showing the construction of the sensorless vector control apparatus in accordance with the preferred embodiment of the present invention.

As shown in FIG. 6, the sensorless vector control apparatus of the present invention includes a 'd' axis voltage command unit 200 having a low pass filter (LPT) 203 for receiving the actual current of 'q' axis (iqs) flowing at the motor, low-passing it to remove an unnecessary portion, and outputting the filtered current (iqs), a first multiplier 204 for receiving the filtered current (iqs) having passed the low pas filter 203, multiplying it by a stator resistance, and outputting a voltage, a voltage operator 205 for receiving the current (iqs) having been filtered by the low pass filter 203, multiplies it by the synchronous speed (We) and an inductance value δL, and generating a voltage, a low pass filter 201 for receiving the actual current of 'd' axis (ids) flowing at the motor, low-passing it to remove an unnecessary portion, and outputting the filtered current, a second multiplier 202 for multiplying the filtered current having passed the low pass filter by a stator resistance, and outputting a voltage, and a third operator 206 for operating the voltage outputted from the second multiplier 202 and the voltage outputted from the voltage operator 205, and generating a 'd' axis voltage (Vds); a 'q' axis voltage command unit 100 having a voltage generator 111 for receiving the synchronous speed (We) from the speed controller and generating a voltage corresponding to the synchronous speed so that a V/F ratio can be constant, a 'd' axis current controller 101 for controlling the 'd' axis current to constantly control a flux, and a second operator 112 for operating the output voltage of the voltage generator 111 and the voltage outputted from the 'd' axis current controller 101 and generating a 'q' axis voltage (Vqs); a voltage converter 300 for converting the 'q' axis voltage (Vqs) of the 'q' axis voltage command unit(100), the 'd' axis voltage (Vds) of the 'd' axis voltage command unit 200 into three phase voltages (Va, Vb, Vc) and outputting them; and inverter 400 for receiving the three phases voltages (Va, Vb, Vc) from the voltage converter 300 and controlling a speed of the induction motor.

The 'd' axis current controller 101 includes a first operator 113 for receiving the current command value of 'd' axis component (ids*) according to a rating of the motor and the actual current (ids) flowing at the 'd' axis current controller 101 and obtaining an error; and a first proportional integral circuit 114 for receiving the error value from the first operator and generating a voltage in proportion to the current error.

The operation of the sensorless vector control apparatus constructed as described above will now be explained.

When the speed controller receives the speed command value (Wr*) according to a user's input and provides the speed variation-compensated synchronous speed (We) to the 'q' axis voltage command unit 100.

Then, the voltage generator 111 of the 'q' axis voltage command unit 100 generates a voltage corresponding to the synchronous speed (We) so as for the ratio of V/F to be constant, and outputs it to the second operator 112.

At this time, the first operator 113 obtains an error between the current command value (ids*) of the 'd' axis component (the torque component) according to the rating of the motor and the actual current (ids) of 'q' axis (a magnetization component) flowing at the motor, and provides it to the first proportional integration controller 114.

Then, the first proportion integral controller 114 generates a voltage in proportion to the current error and outputs it to the second operator 112.

When the 'q' axis voltage command unit 100 is operated as described above, the low pass filter 203 of the 'd' axis voltage command unit 200 receives the actual current of 'q' axis (iqs) flowing at the motor, low-passes it to remove an unnecessary portion, and transmits the filtered current (iqs) to the first multiplier 204.

Then, the first multiplier 204 multiplies the filtered current (iqs) having passed the low pass filter by the stator resistance (Rs) to generate a voltage and provides the generated voltage to the second operator 112 of the 'q' axis voltage command unit 100.

Accordingly, the second operator 112 adds the output voltage of the voltage generator 111, the output voltage of the first proportional integration circuit 114 and the voltage outputted through the first multiplier 204 to generate the 'q' axis voltage (Vqs) and provides it to the voltage converter 300.

When the 'q' axis voltage (Vqs) is generated from the 'q' axis voltage command unit 100 and inputted to the voltage converter 300, the current filtered through the low pass filter 203 multiplies the current,(iqs) having been filtered by the low pass filter 203 by the synchronous speed (We) and the inductance value (δL), and outputs the generated voltage to the third operator 206.

At this time, the low pass filter 201 receives the actual current of 'd' axis (ids) flowing at the induction motor and removes an unnecessary portion thereof, and then, the second multiplier 202 multiplies the actual current of 'd' axis (ids) by the stator resistance (Rs) and outputs it to the third operator 206.

The third operator 206 subtracts the voltage outputted from the voltage operator 223 from the voltage outputted from the second multiplier 202 to generate a 'd' voltage (Vds) and provides it to the voltage converter 300.

Then, the voltage converter 300 converts the two phase voltages (Vqs and Vds) of the 'q' axis voltage command unit 100 and the 'd' axis voltage command unit 200 into three phase voltages (Va, Vb, Vc) and supplies them to the inverter 400 for controlling the speed of the induction motor.

Therefore, the 'd' axis current and the 'q' axis current can be independently controlled, and at this time, since the current is controlled by the 'd' axis current controller 101, the torque response speed is faster, compared to the case of controlling a magnetic flux.

The 'q' axis voltage (Vqs) and the 'd' axis voltage (Vds) are respectively generated from the second operator 112 and the third operator 206 are obtained by the following equations $$Vqs=Rs*iqs+We*Ls*ids=Rs*iqs+E \quad (8)$$

$$Vds=Rs*ids-We*\delta Ls*iqs \quad (9)$$

$$\delta Ls=Ls-Lm2/Lr\sim Lls+Llr \quad (10)$$

wherein 'Rs' indicates a stator resistance, 'Ls' indicates a stator reactance, 'Lm' indicates a magnetization reactance, 'Lr' indicates a rotor reactance, 'Lls' indicates a stator leakage reactance, 'Llr' indicates a rotor leakage reactance, 'ids' indicates an actual current of 'd' axis (the flux current) flowing at the motor, and 'iqs' indicates an actual current of 'q' axis (the torque current) flowing at the motor.

Equation (8) can be also expressed as follows:

$$Vqs=Rs*iqs+E \quad (11)$$

$$E=We*Ls*ids \quad (12)$$

wherein 'E' indicates a back electromotive force component of the motor.

Accordingly, by controlling the back electromotive component (E) of equation (11), the flux can be constantly maintained.

Figure 7:
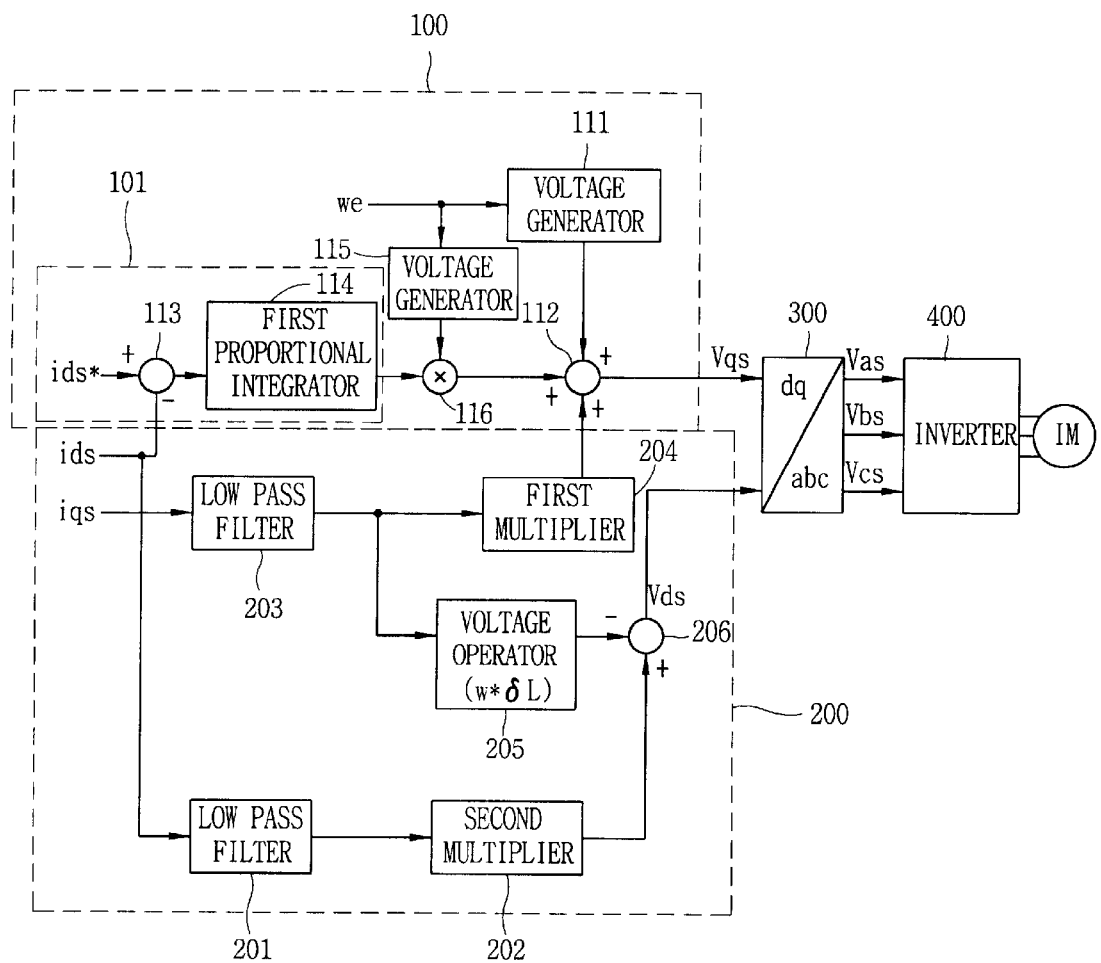
FIG. 7 is a schematic block diagram of a sensorless vector control apparatus in accordance with another embodiment of the present invention.

FIG. 7 is a schematic block diagram of a sensorless vector control apparatus in accordance with another embodiment of the present invention;

As shown in FIG. 7, a sensorless vector control apparatus in accordance with another embodiment of the present invention additionally includes a voltage generator 115 for supplying a predetermined voltage according to the synchronous speed (We) to the 'q' axis voltage command unit; and a multiplier 116 for multiplying the voltage outputted from the first proportion integral controller and the voltage outputted from the voltage generator 115.

The operation of the thusly constructed sensorless vector control apparatus will now be described.

The multiplier 116 multiplies a voltage in proportion to a current error outputted from the first proportional integrator 114 and a voltage from the voltage generator 115 together, and outputs them to the second operator 112, thereby obtaining a 'q' axis voltage (Vqs).

The operation for obtaining the 'd' axis voltage (Vds) is the same as FIG. 6 as described above.

Figure 8A:
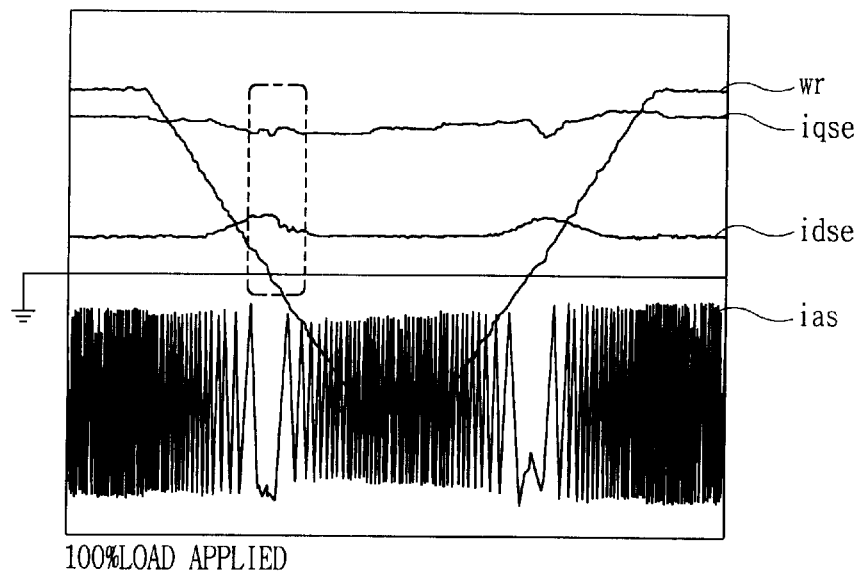
FIG. 8A shows a wave form generated when a load is applied to the sensorless vector control apparatus in accordance with the preferred embodiment of the present invention.
Figure 8B:
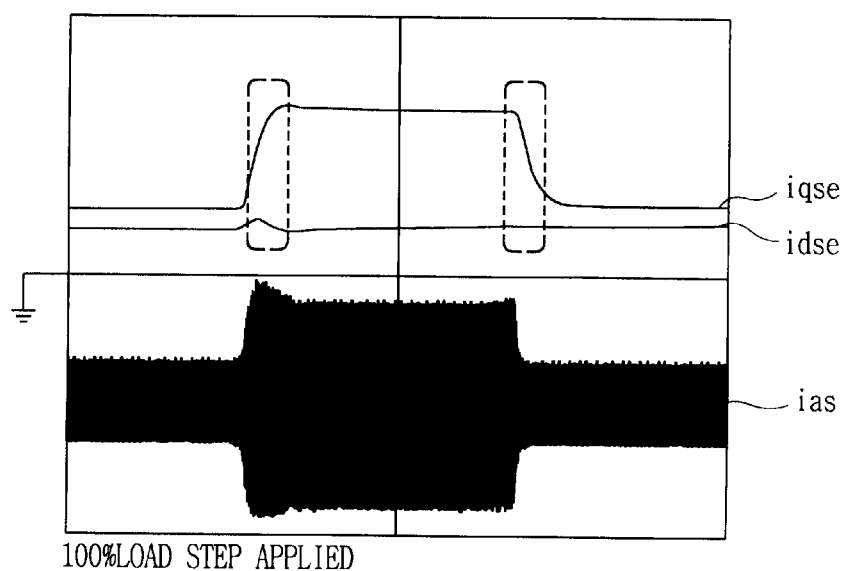
FIG. 8B shows a wave form generated when a load step (a torque current) is applied to the sensorless vector control apparatus in accordance with the preferred embodiment of the present invention.
Figure 9A:
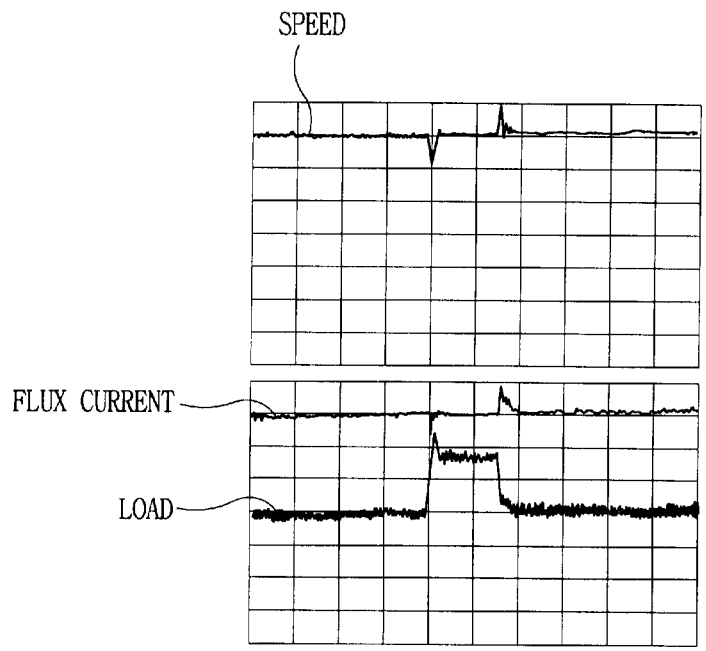
FIGS. 9A through 9D show wave forms of a speed, a flux current and a load in accordance with the preferred embodiment of the present invention.
Figure 9B:
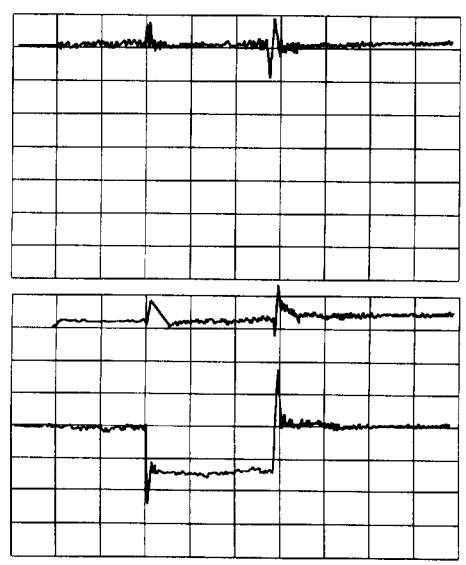
Figure 9C:
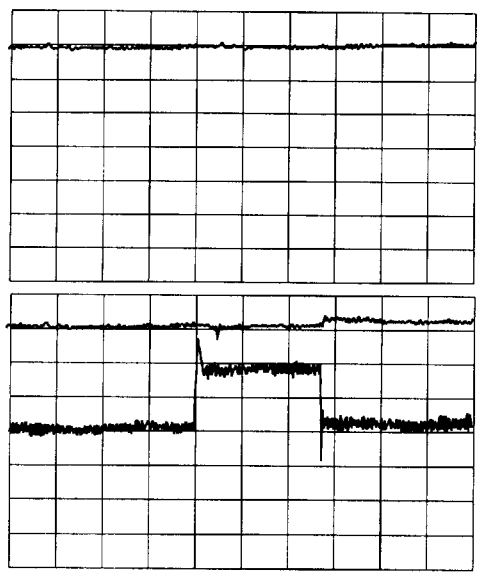
Figure 9D:
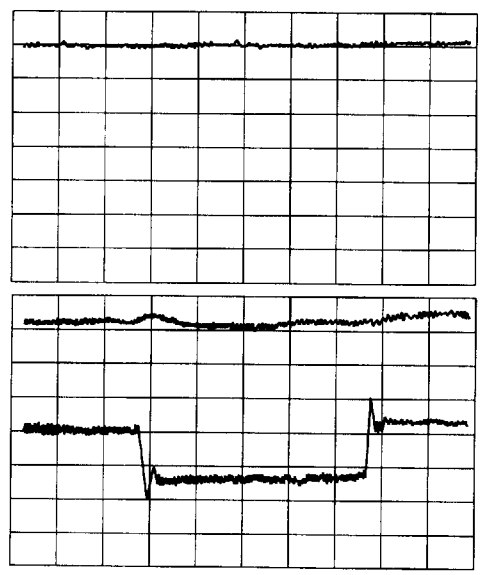

FIGS. 8A and 8B show wave forms obtained according to an experimental result of the sensorless vector control apparatus in accordance with the preferred embodiment of the present invention.

Compared with the prior art in which the induction motor is not controlled in an interval where the speed is '0' when 100% load is applied thereto, with reference to FIG. 8A, with the circuit construction of the present invention, since the flux current is constantly maintained, the induction motor is accordingly controlled constantly.

With reference to FIG. 8B, after 100% load step (the torque current) is applied, even though it falls to 0% load step, the induction motor is stably driven, so that the flux current is constant.

FIGS. 9A through 9D show wave forms of a speed, a flux current and a load in accordance with the preferred embodiment of the present invention.

As shown in FIGS. 9A through 9D, even through the induction motor is driven at a high speed or at a low speed, there is no speed variation according to the load, and thus, the flux is seen constant.

As so far described, the sensorless vector control apparatus and method has many advantages.

For example, first, since the vector control can be performed over the whole velocity range without using a speed sensor, the sensorless vector control apparatus may be employed with advantage.

Secondly, since the amount of arithmetic operation for implementing an algorithm is minimal, the algorithm can be implemented even with a conventional CPU or DSP.

Thirdly, the apparatus can be easily adapted to the industrial sector.

Fourthly, it can be adopted to the speed control field, or sector which requires the initiating torque.

Lastly, in line with the large capacity inverter, the flux is reduced in accelerating or decelerating in the speed of the induction motor, and thus, the problem of occurrence of a torque hunting is solved. Accordingly, the general inverter can be adapted to every industrial field.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A sensorless vector control apparatus comprising:
    a speed controller for receiving a speed command value from a user and outputting a synchronous speed;
    a 'd' and 'q' axis voltage command unit for receiving the synchronous speed command value and converting into a 'd' axis voltage and a 'q' axis voltage;
    a voltage converter for receiving the 'q' axis voltage and the 'd' axis voltage, and converting the two phase voltages into three phase voltages; and
    an inverter for receiving the three phase voltages and controlling a speed of an induction motor.

2. The apparatus of claim 1, wherein the speed controller comprises:
    a first operator for computing an error value between the speed command value from the user and an actual speed of the induction motor;
    a proportional integrator for receiving the error between the speed command value and the actual speed and computing a slip frequency of the induction motor; and
    a second operator for adding the slip frequency and the speed command value and obtaining a synchronous speed.

3. The apparatus of claim 1, wherein the 'd' axis voltage command unit comprises:
- a low pass filter for receiving the actual current of 'q' axis (iqs) flowing at the induction motor, low-passing it to remove an unnecessary portion, and outputting the filtered current (iqs);
- a first multiplier 204 for receiving the filtered current (iqs), multiplying it by a stator resistance value (Rs), and outputting a voltage;
- a voltage operator for receiving the filtered current (iqs), multiplying it by the synchronous speed (We) and an inductance value δL, and generating a voltage;
- a low pass filter for receiving the actual current of 'd' axis (ids) flowing at the induction motor, low-passing it to remove an unnecessary portion, and outputting the filtered current;
- a second multiplier for multiplying the filtered current value by a stator resistance value (Rs), and outputting a voltage; and
- a third operator for operating the voltage value outputted from the second multiplier and the voltage outputted from the voltage operator, and generating a 'd' axis voltage (Vds).

4. The apparatus of claim 1, wherein the 'q' axis voltage command unit comprises:
- a voltage generator for receiving the synchronous speed (We) from the speed controller and generating a voltage corresponding to the synchronous speed so that a Voltage to Frequency ratio can be constant;
- a 'd' axis current controller for controlling the 'd' axis current to constantly control a flux; and
- a second operator for operating the output voltage of the voltage generator, the voltage outputted from the 'd' axis current controller and the output voltage of 'q' axis component of the induction motor, and generating a 'q' axis voltage (Vqs).

5. The apparatus of claim 4, wherein the 'd' axis current controller comprises:
- a first operator for receiving the current command value of 'd' axis component according to a rating of the induction motor and the actual current flowing at the induction motor, and obtaining an error; and
- a first proportional integral circuit for receiving the error value from the first operator and generating a voltage in proportion to the current error.

6. The apparatus of claim 4, wherein the 'd' axis current controller obtains a response speed by controlling a current.

7. The apparatus of claim 4, wherein the 'q' axis voltage command unit comprises;
- a voltage generator for receiving the synchronous speed an d providing a predetermined voltage; and
- a multiplier for multiplying the voltage outputted from the 'd' axis current controller and the voltage outputted from the voltage generator.

8. A sensorless vector control method for receiving a speed command value from a user and controlling a speed of an induction motor, comprising the steps of;
- receiving the speed command value according to a user's input by a speed controller;
- compensating a speed variation according to a load variation by the speed controller;
- receiving a synchronous speed, a current command value of 'd' axis component, an actual current of 'd' axis and an actual current of 'q' axis, and generating a 'q' axis voltage by a 'q' axis voltage command unit and a 'd' axis voltage by a 'd' axis voltage command unit;
- converting the 'q' axis voltage and the 'd' axis voltage into three phase voltages; and
- providing the three phase voltage into an inverter.

9. The method of claim 8, wherein the 'd' axis voltage command unit controls the 'd' axis current and the 'q' axis current separately.

10. The method of claim 8, wherein, in the 'q' axis voltage command unit, the 'q' axis voltage is generated by using equations of Vqs=Rs*iqs+We*Ls*ids=Rs*iqs+E, E=We*Ls*ids, wherein 'Rs' indicates a stator resistance, 'Ls' indicates a stator reactance, 'ids' indicates an actual current of 'd' axis (the flux current) flowing at the motor, 'iqs' indicates an actual current of 'q' axis (the torque current) flowing at the motor, and 'E' indicates a back electromotive force component of the motor.

11. The method of claim 10, wherein the flux can be constantly maintained by controlling the back electromotive force component (E).

12. The method of claim 8, wherein the 'd' axis voltage of the 'd' axis voltage command unit is generated by using equations of Vds=Rs*ids−We*δLs*iqs, δLs=Ls−Lm2/Lr~Lls+Llr, wherein 'Rs' indicates a stator resistance, 'Ls' indicates a stator reactance, 'Lm' indicates a magnetization reactance, 'Lr' indicates a rotor reactance, 'Lis' indicates a stator leakage reactance, 'Llr' indicates a rotor leakage reactance, 'ids' indicates an actual current of 'd' axis (the flux current) flowing at the motor, and 'iqs' indicates an actual current of 'q' axis (the torque current) flowing at the motor.

13. The method of claim 8, wherein the algorithm generating the 'd' axis voltage and the 'q' axis voltage is implemented by using a central processing unit or a digital signal processor.

14. The method of claim 8, wherein in the step of compensating the speed variation according to a load variation in the speed controller, the speed variation is compensated by controlling a slip frequency by the speed controller.

15. The method of claim 8, wherein the step of compensating the speed variation according to a load variation by using the speed controller, comprises:
- a step in which a first operator of the speed controller receives a speed command value according to a user's input and obtains an error between the speed command value and an actual speed, and supplying the error to the proportional integrator;
- a step in which the proportional integrator performs a proportional integral operation to obtain a slip frequency of a motor, and provides it to a second operator; and
- a step in which the slip frequency and the speed command value are added to obtain a synchronous speed.

16. The method of claim 15, wherein the synchronous speed is obtained by equation (2) by using equation (1):

$$Wslip=(Rr/Lr)*iqs/ids \qquad (1)$$

$$Wr=We-Wslip \qquad (2)$$

wherein 'Rr' indicates a secondary resistance of the induction motor, 'Lr' indicates a motor reactance, 'ids' indicates an actual current of 'd' axis (the flux current) flowing at the motor, 'iqs' indicates an actual current of 'q' axis (the torque current) flowing at the motor, 'Wr' indicates a speed of the motor, and 'We' indicates a synchronous speed.

* * * * *